(No Model.)

W. J. VAN BROEK.
SAFE LOCK.

No. 473,800. Patented Apr. 26, 1892.

Witnesses:
C. S. Burnham
H. P. Sisson

Inventor:
Wilhelm Johann van Broek
per Heinrich Lade
Attorney.

UNITED STATES PATENT OFFICE.

WILHELM JOHANN VAN BROEK, OF COLOGNE, GERMANY.

SAFE-LOCK.

SPECIFICATION forming part of Letters Patent No. 473,800, dated April 26, 1892.

Application filed February 19, 1889. Serial No. 300,441. (No model.)

*To all whom it may concern:*

Be it known that I, WILHELM JOHANN VAN BROEK, a subject of the King of Prussia, residing in the city of Cologne, Prussia, German Empire, have invented certain new and useful Locks for Safes; and I do hereby declare that the following is a full, clear, and exact description of the invention, which will enable others skilled in the art to which it appertains to make and use the same.

This invention relates to locks for safes.

It consists of an arrangement of slide-bolts which when in the closed position assume the form of an open rectangular frame composed of four locking-bolts actuated by a common driving-wheel to take into corresponding recesses of the door-frame and of four diagonal bolts also actuated by one common driving-wheel to take into four wedge-shaped gaps between the locking-bolts when in the locked position, so as to fill up, or nearly so, the said gaps.

Figure 1:
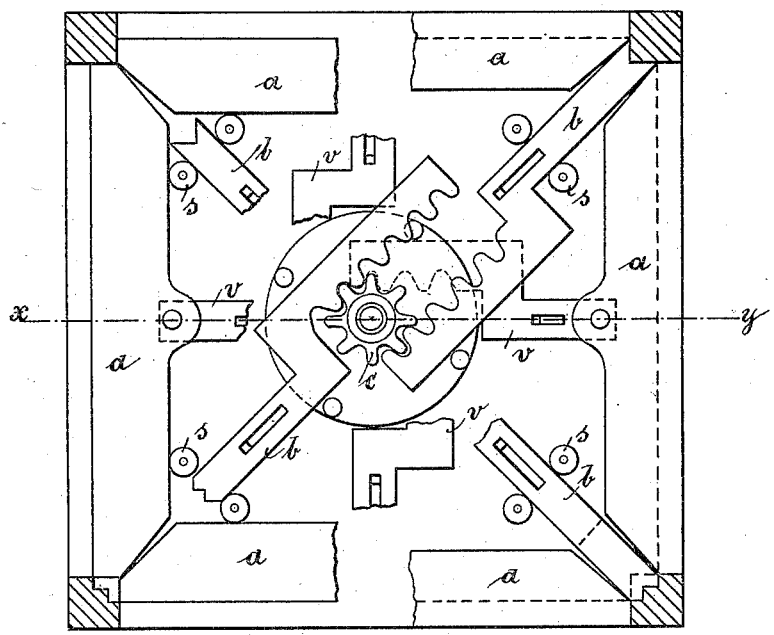
Figure 2:
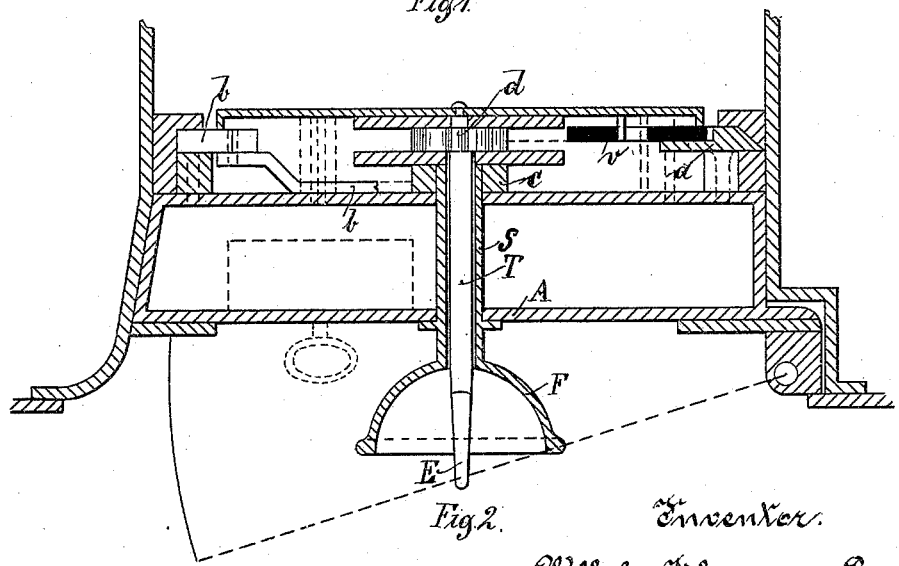

In the accompanying drawings, Figure 1 is an inside front view of the lock of this invention, the right-hand side showing the same locked and the left-hand side open. Fig. 2 is a section taken through line $x\ y$ of Fig. 1.

A is the frame of the safe-door, in which is mounted the hollow spindle S, on which the driving-wheel $c$ is fixed.

T is a spindle inserted in hollow spindle S and connected to the driving-wheel $d$. Spindle S is turned by hollow head F as a handle, and spindle T by wing E.

$v$ are toothed rods engaging in driving-wheel $d$. At their outer ends they are connected to the four locking-bolts $a$, the ends of which are beveled. Bolts $a$ are of such a length that they each lock or engage the whole length of a side of the door-frame.

$b$ are the four diagonal bolts engaging by their toothed extensions in driving-wheel $c$.

$s$ are rollers for steadying and guiding bolts $b$ in their sliding movement.

To lock the safe, the wing E is turned, turning toothed driving-wheel $d$, so as to drive outward toothed rods $v$ and bolts $a$, two vertically and two horizontally, so that these bolts take into corresponding recesses in the frame against which the door closes. In this position the bolts $a$ present a rectangular outline and are located partly in the safe-door and partly in the safe-frame against which the door closes. There are, however, wedge-shaped gaps at the corners. Head F is now turned, turning toothed driving-wheel $c$ and driving the four bolts $b$ diagonally outward into the said wedge-shaped gaps, so as with the locking-bolts $a$ to form a complete frame. If now bolts $b$ are secured by any suitable safety-lock applied at a convenient place, the eight bolts will form a firm connection between door and door-frame and not only prevent the opening of the door, but will also serve as an air-tight closure. The recesses in the door-frame and the bolts $a$ may be of any convenient cross-sectional form. In the case of large safes two or more of such locking-bolt mechanisms may be arranged in the door one behind the other.

What I claim as my invention, and desire to secure by Letters Patent, is—

A locking device consisting of four bolts $a$, operated by means of wing E and driving-wheel $d$ to slide, two horizontally and two vertically, into corresponding recesses in the door-frame, said bolts $a$ when in the locked position forming a rectangular frame having wedge-shaped gaps at the corners, and of four diagonal bolts $b$, operated by means of hollow head F and driving-wheel $c$, said bolts $b$ when in the locked position taking into the wedge-shaped gaps of the frame formed by bolts $a$ and securing them in their positions, bolts $b$ being in turn secured in the locked position by means of a safety-lock, substantially as described and shown.

In testimony whereof I signed this specification in the presence of two subscribing witnesses.

WILHELM JOHANN VAN BROEK.

Witnesses:
GUSTAVE ALBERT OELRICHS,
RICHARD MÖST.